Patented July 27, 1937

2,088,328

UNITED STATES PATENT OFFICE 2,088,328

MONOAZO DYES AND PROCESS FOR MANUFACTURING THE SAME

Walter Leister, Wolfen, Kreis Bitterfeld, Germany, assignor to General Aniline Works, Inc., New York, N. Y., a corporation of Delaware No Drawing. Application October 17, 1936, Serial No. 106,187. In Germany October 4, 1935

5 Claims. (Cl. 260—97)

My present invention relates to new azo dyes and to a process for manufacturing the same.

U. S. Patent No. 2,010,921 describes a process for making dyes in which an azo dye obtained by alkaline coupling of 3-amino-1-hydroxybenzene, in which the 4-position to the hydroxyl group is free, with at least one diazo compound containing a sulfonic acid or carboxylic acid group which lends solubility, and containing no group capable of forming a metallic complex, is treated in alkaline solution with an oxidizing agent, particularly a cupric compound. Dyes thus obtained have a better fastness to light than that of the parent dyes and are primarily suitable for dyeing leather yellow to brown tints.

This invention relates to the manufacture of dyes of still better fastness to light and yielding particularly fine clear yellow-brown tints by using for the coupling described in the aforesaid patent instead of the 3-amino-1-hydroxybenzenes a meta-aminophenol containing an acetyl or benzoyl group as substituent.

The following examples illustrate the invention, the parts being by weight:

*Example 1.*—30.9 parts of 4-nitro-4'-aminodiphenylamine-2-sulfonic acid are diazotized and the diazo compound is coupled with 16 parts of acetyl-3-amino-1-hydroxybenzene in solution alkaline with sodium carbonate. When coupling is finished the mixture is heated to 80° C. and a solution of 50 parts of crystallized copper sulfate and 80 parts of ammonia of 25 per cent. strength is added. After stirring for a short time at 80° C. the whole is filtered hot and the dye is salted out from the filtrate. It dyes chrome leather and vegetable tanned leather clear yellow-brown tints of excellent fastness to light. The dye obtained from 3-amino-1-hydroxybenzene which is not acetylated dyes Havana brown.

*Example 2.*—30.9 parts of 4-nitro-4'-aminodiphenylamine-2-sulfonic acid are diazotized and coupled in solution alkaline with sodium carbonate with 24 parts of benzoyl-3-amino-1-hydroxybenzene. When the coupling is complete the dye is furthermore treated with a cupric compound and worked up as described in Example 1. It dyes chrome leather and vegetable tanned leather tints which are somewhat redder than those produced by the dye in Example 1, while the properties of fastness have a similar excellence.

It is obvious that my invention is not limited to the foregoing examples nor to the specific details given therein. The dyes which may be treated in the manner described in the examples may correspond to the general formula

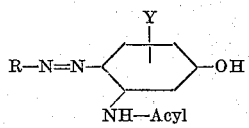

wherein R is the radicle of a diazo compound containing at least one sulfonic acid or carboxylic acid group and acyl means acetyl or benzoyl. These dyes shall not contain groups capable of forming a metal complex compound namely —OH, —COOH, —O-alkyl in ortho-position to the azo group. Now, the 4-nitro-4'-aminodiphenylamine-2-sulfonic acid used in the foregoing examples as diazo component may be substituted by one of the following amines:—1-aminobenzene-4-sulfonic acid, 4-nitro-1-amino-2-sulfonic acid, 4-aminoazobenzene-3,4'-disulfonic acid, 2-aminonaphthalene-4,8-disulfonic acid, 2-amino-8-hydroxynaphthalene-6-sulfonic acid. In the formula given above, Y means hydrogen, alkyl, halogen and alkoxy and thus instead of acetylated or benzoylated 3-amino-1-hydroxybenzene there may be used the corresponding acetylated 1-methyl-4-amino-2-hydroxybenzene and similar products bearing one of the mentioned substituents.

In the examples I have suggested an ammoniacal solution of copper sulfate as oxidizing agent. However, I may likewise use an aqueous solution of crystallized copper sulfate or of any other salt of the bivalent copper, care being taken that the reaction mixture always is alkaline by the presence of, for instance, sodium carbonate. Instead of 50 parts of crystallized copper sulfate there may be used 12 parts of hydrogen peroxide of 30 per cent. strength in the presence of some cupric oxide as a catalyst.

What I claim is:—

1. The process which comprises heating an azo dye of the general formula

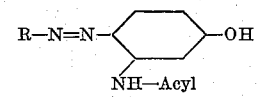

in which R stands for a member of the group consisting of a sulfonated radicle of the benzene series and a sulfonated radicle of the naphthalene series and acyl is a member of the group consisting of acetyl and benzoyl, said dye being in the ortho-positions to the azo group free from groups capable of forming a metal complex, in an alkaline medium with a cupric oxide compound.

2. The process which comprises heating an azo dye of the general formula

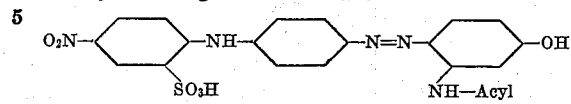

in which acyl stands for a member of the group consisting of acetyl and benzoyl, in an alkaline medium with a cupric oxide compound.

3. The process which comprises heating the azo dye of the formula

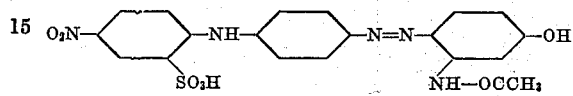

in an alkaline medium with a cupric oxide compound.

4. The process which comprises heating the azo dye of the formula

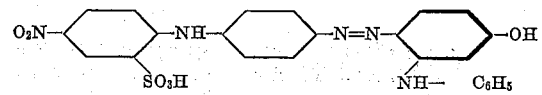

in an alkaline medium with a cupric oxide compound.

5. The dyes dyeing leather from an acid bath yellow to brown tints of good fastness as being obtainable by the process as set forth in claim 1.

WALTER LEISTER.